Nov. 4, 1952     T. G. HAWLEY, JR., ET AL     2,616,486

CUSHION

Filed Dec. 6, 1950

INVENTORS
Thomas G. Hawley, Jr.
BY Edward F. Landau

ATTORNEY

Patented Nov. 4, 1952

2,616,486

UNITED STATES PATENT OFFICE 2,616,486

CUSHION

Thomas G. Hawley, Jr., Englewood, and Edward F. Landau, South Orange, N. J., assignors to United Merchants and Manufacturers, Inc., New York, N. Y., a corporation of Delaware Application December 6, 1950, Serial No. 199,432

11 Claims. (Cl. 155—184)

This invention relates to natural and synthetic plastic materials, and their use conjointly in forming various structures.

More particularly the invention relates to the use of polyvinyl chloride and foam rubber, in contiguous or in adjacent relation.

The invention is particularly adapted for use in the upholstery field, where foam rubber is used extensively as a stuffing material or filling for cushions, chairs and the like, and where plasticized polyvinyl chloride sheeting or film finds wide use as a covering material, but where their concurrent use in the same article has been greatly curbed by the deleterious effects produced by prolonged contact of the one material with the other.

Thus it has been found that, when polyvinyl chloride film forms a covering for a cushion the stuffing of which is foam rubber, long before completion of the normal life span of such a covering it becomes stained or discolored, and loses its flexibility to the point of embrittlement. The discoloration may be attributed to the migration of color-forming bodies usually present as anti-oxidants and as accelerators, from the foam rubber into the film. Embrittlement, on the other hand, may be attributed to migration of plasticizer from the film into the foam rubber. By means of the present invention, it is possible to construct such a cushion of foam rubber, having a covering of polyvinyl chloride film, without any of the disadvantages customarily associated with such structures as enumerated above.

It is an object of the invention so to treat a polyvinyl chloride film, that it may be placed in prolonged contact with foam rubber without any staining or embrittlement resulting. Another object is the production of upholstery cushions having a filling of foam rubber and a covering of polyvinyl chloride film. Still another object is the production of articles of furniture such as, for example, upholstered chairs in which the padding or stuffing is foam rubber and the covering is polyvinyl chloride film.

With the above and other objects in view, as will be apparent, the invention consists in the construction, combination and arrangement of parts, all as hereinafter more fully described, claimed and illustrated in the accompanying drawings, wherein:

According to the invention, foam rubber and polyvinyl chloride film may be used conjointly in structures without the usual deleterious effects, if a barrier coating or film is introduced between the two materials. The barrier may be any one of a number of materials which have the desired resistance to penetration by the plasticizer, the anti-oxidants, and the accelerators. A suitable material for the barrier is polyvinyl alcohol. Polyvinyl acetate, plasticized or unplasticized, is another material which gives satisfactory results. Mixtures of polyvinyl alcohol and polyvinyl acetate may also be employed. Other organic films such as cellophane, or regenerated cellulose, and cellulose acetate have also been found effective.

The thickness of the barrier film required varies with different materials. Films of approximately 1 mil thickness or slightly less have been found effective in the case of polyvinyl alcohol, cellophane and cellulose acetate, while with vinyl acetate a film of 4–5 mils thickness is required for best results. Films substantially less than 1 mil in thickness have not been used, since these are not readily available and are usually too fragile for use in the manner described.

Figure 1:
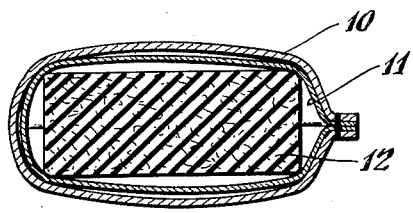
Fig. 1 is a section through a cushion embodying the invention.

Referring now to the drawings, Fig. 1 shows a cross-section of a cushion having an outer envelope 10 of plasticized polyvinyl chloride film, an inner barrier envelope 11 of a film made from one or more of the materials mentioned above, such as polyvinyl alcohol, for example, and a center padding portion 12 of foam rubber.

Figure 2:
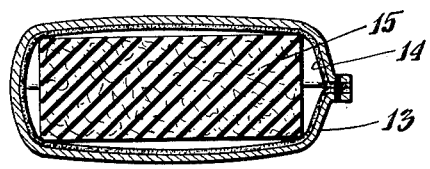
Fig. 2 is a section through another cushion embodying another form of the invention.

Fig. 2 shows in cross section a cushion having an outer envelope 13 of polyvinyl chloride film, to the inner surface of which has been adhered a barrier coating 14 of polyvinyl acetate or other suitable material. The coating 14 may be a single layer of one material or alternatively it may consist of a composite coating, such, for example, as a layer of polyvinyl acetate to which is adhered a coating of polyvinyl alcohol. A center padding portion 15 of foam rubber gives resilience to the cushion.

Figure 3:
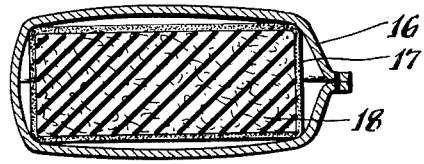
Fig. 3 is a section through another cushion embodying a third form of the invention.

Fig. 3 shows a cross section of a cushion embodying another form of the invention. The cushion in this case comprises an outer envelope 16 of polyvinyl chloride film, a coating 17 of plasticized polyvinyl acetate or other suitable material, and a pad 18 of foam rubber to the outer surface of which the coating 17 is adhered. The invention is also useful in the production of cushioned chairs or other padded structures in which the padding rests on or is secured to a rigid frame. In this case the foam rubber would rest against the support and the successive layers of film or the film carrying the barrier coating on its inner surface would cover the foam rubber.

In order to demonstrate the effectiveness of the barrier material the following experiments were performed, and are included here by way of illustration:

Example I

A small pillow case or envelope was made of 12 to 16 gauge (12 to 16 mils in thickness) plasticized polyvinyl chloride film having as a separate liner on the inside a 1 gauge film of polyvinyl alcohol, by laying the polyvinyl alcohol film on the polyvinyl chloride film, folding once and then sealing two edges by stitching. This small pillow was then stuffed with foam rubber, and the remaining edge was then stitched. A similar pillow was made omitting the alcohol film. Both pillows were then placed in a hot air oven at 210° F. for 24 hours. At the end of this period the test samples were removed and examined and compared with a piece of the original vinyl sheeting. The sheeting used on the pillow containing the polyvinyl alcohol liner showed no appreciable change in either hand or color of the outer surface, whereas the other test sample was badly discolored or yellowed on the outer surface, and had become harsh and brittle.

*Example II*

The above experiment was repeated using 1 gauge cellophane, 1 gauge cellulose acetate film, 3 gauge polyethylene film and 3 gauge polystyrene film as the protective liners. The results obtained indicated that the cellophane and the cellulose acetate were as satisfactory as was the polyvinyl alcohol in the above experiment, while the polystyrene and polyethylene lined pillows showed bad discoloration.

*Example III*

A film of vinyl acetate was cast by conventional means on the back of an upholstery grade vinyl chloride sheet and this sheet was used to prepare a test pillow. The test pillow so prepared was subjected to the same heating test as described in Example I. After heating, this material showed little surface discoloration and remained pliable.

*Example IV*

A film of plasticized polyvinyl acetate ½ to 1 mil in thickness was cast by conventional means on the back of an upholstery grade polyvinyl chloride sheet (12 mils). After drying the film a second layer or film of polyvinyl alcohol (plasticized with glycerine) was cast on top of the polyvinyl acetate film to a thickness of 1 mil. This sheet was then used to prepare a test pillow having the composite coating on the inner face of the covering. The test pillow so prepared was subjected to 24 hours' heating as described in Example I. After heating, this material showed no discoloration.

*Example V*

In order to evaluate the severity of the heating test of Examples I–IV, a test pillow was prepared as in Example I using conventional 12 gauge polyvinyl chloride film for the envelope and foam rubber for the filling. This test pollow was then exposed in a room at 100° F. for a period of approximately four months. Discoloration and embrittlement were approximately the same as that observed after exposure of the same type of pillow for 24 hours at 210° F. in Example I.

While the invention has been described in connection with its use in upholstery cushions it is not limited thereby, but may be used in any structure where it is advantageous to employ a polyvinyl chloride film or sheeting in contact with foam rubber. Thus the invention comprises a barrier for the separation of polyvinyl chloride film from foam rubber at points or areas of common contact.

What is claimed is:

1. An upholstery cushion comprising an envelope of polyvinyl chloride sheeting, an inner envelope of polyvinyl alcohol and a center padding of foam rubber.

2. A structure for use in upholstery comprising a pad of foam rubber, a covering for the pad of polyvinyl chloride sheeting, and a coating of polyvinyl acetate on the inner side of the cover.

3. A structure adapted for use in upholstery or the like comprising a layer of foam rubber, a polyvinyl alcohol film in contact therewith, and a layer of polyvinyl chloride film in contact with the polyvinyl alcohol film.

4. A structure adapted for upholstery use or the like comprising a padding of foam rubber, a film of regenerated cellulose in contact with the foam rubber, and a film of plasticized polyvinyl chloride in contact with the regenerated cellulose.

5. An upholstery cushion comprising an envelope of plasticized polyvinyl chloride film, an inner envelope of cellulose acetate film and a padding of foam rubber completely enclosed in the cellulose acetate envelope.

6. An upholstery cushion comprising an envelope of plasticized polyvinyl chloride film, a coating of polyvinyl acetate on the inner surface of the film and a padding of foam rubber in the envelope.

7. Method of preparing an upholstery cushion including the steps of coating one surface of a polyvinyl chloride film with polyvinyl acetate, forming an envelope of the coated film with the coating on the inside of the envelope and inserting a pad of foam rubber into the said envelope.

8. A structure for upholstery use comprising a pad of foam rubber covered by a plastic film of a material selected from the group of high polymers consisting of regenerated cellulose, cellulose acetate, polyvinyl alcohol and polyvinyl acetate, and an outer covering for the structure of plasticized polyvinyl chloride.

9. Method of making an upholstery cushion including the steps of laying a sheet of 1 gauge polyvinyl alcohol film on a sheet of plasticized polyvinyl chloride sheeting, forming the two sheets into two adjacent and contiguous envelopes with the polyvinyl alcohol envelope inside, said envelopes adapted to enclose an upholstery filling, and inserting a filling of foam rubber into the polyvinyl alcohol envelope.

10. An upholstery cushion comprising an envelope of plasticized polyvinyl chloride film, a composite coating on the inner surface of the film, said composite coating comprising a layer of polyvinyl acetate and a layer of polyvinyl alcohol, and a padding of foam rubber in the envelope.

11. An upholstery cushion comprising an envelope of plasticized polyvinyl chloride film, a coating of polyvinyl acetate on the inner surface of the film, an inner coating of polyvinyl alcohol on the inner surface of the polyvinyl acetate coating, and a padding of foam rubber in the envelope.

THOMAS G. HAWLEY, Jr.
EDWARD F. LANDAU.

REFERENCES CITED

The following references are of record in the file of this patent:

UNITED STATES PATENTS

| Number | Name | Date |
|---|---|---|
| 2,028,936 | Kratz | Jan. 28, 1936 |
| 2,370,419 | Ray | Feb. 27, 1945 |
| 2,452,152 | Rooney et al. | Oct. 26, 1948 |
| 2,558,244 | Gibbons | June 26, 1951 |